(12) United States Patent
Weissbrodt

(10) Patent No.: US 8,051,777 B2
(45) Date of Patent: Nov. 8, 2011

(54) SWITCH FOR A POWERED PALLET CONVEYOR

(75) Inventor: Andreas Weissbrodt, Munich (DE)

(73) Assignee: Rofa Rosenheimer Forderanlagen GmbH, Kolbermoor (DE)

( * ) Notice: Subject to any disclaimer, the term of this patent is extended or adjusted under 35 U.S.C. 154(b) by 114 days.

(21) Appl. No.: 12/626,390

(22) Filed: Nov. 25, 2009

(65) Prior Publication Data

US 2010/0147183 A1 Jun. 17, 2010

(30) Foreign Application Priority Data

Dec. 17, 2008 (DE) .................. 20 2008 016 678 U

(51) Int. Cl.
*B61B 3/00* (2006.01)
(52) U.S. Cl. .................. 104/102; 246/219; 104/130.06
(58) Field of Classification Search .............. 246/415 R, 246/419, 430, 257, 262; 104/96, 99, 102, 104/130.01, 130.06
See application file for complete search history.

(56) References Cited

U.S. PATENT DOCUMENTS

| | | | | |
|---|---|---|---|---|
| 1,911,241 A * | 5/1933 | Rosenthal | .................. | 238/10 R |
| 2,138,962 A * | 12/1938 | Forker, Jr | ..................... | 104/102 |
| 2,211,220 A * | 8/1940 | Verplanck | ...................... | 104/35 |
| 2,996,017 A * | 8/1961 | Gorjanc et al. | ............... | 104/102 |
| 4,109,584 A * | 8/1978 | Mihirogi | .................. | 104/130.06 |
| 4,416,202 A * | 11/1983 | Rooklyn | .................... | 104/130.01 |
| 4,920,891 A * | 5/1990 | Loomer | ........................ | 104/102 |
| 5,154,123 A * | 10/1992 | Loomer | ........................ | 104/102 |
| 5,193,767 A * | 3/1993 | Mihirogi | ....................... | 246/418 |
| 5,247,890 A * | 9/1993 | Mihirogi | .................. | 104/130.11 |
| 5,325,789 A * | 7/1994 | Tapias | ..................... | 104/130.01 |
| 5,440,996 A * | 8/1995 | Cottino | ............................ | 104/47 |
| 6,102,770 A * | 8/2000 | Cyrus et al. | .................. | 446/444 |
| 7,414,378 B2 * | 8/2008 | Dawson | .......................... | 318/560 |
| 2010/0000440 A1* | 1/2010 | Meinzinger | .................. | 104/102 |
| 2010/0147183 A1* | 6/2010 | Weissbrodt | ................... | 104/307 |
| 2010/0163688 A1* | 7/2010 | Blum | ............................ | 246/219 |

* cited by examiner

*Primary Examiner* — Joe Morano, IV
*Assistant Examiner* — Jason C Smith
(74) *Attorney, Agent, or Firm* — Greenberg Traurig, LLP

(57) ABSTRACT

In one embodiment of the present disclosure, a switch for a powered pallet conveyor is provided. The switch comprising (a) a turntable and (b) rail portions which are arranged upon the turntable and define at least a first travel pathway and a second travel pathway, whereby the first travel pathway is defined by straight rail portions and a second travel pathway is defined by curved rail portions, so that the central line of the first travel pathway and the departure lines of the second travel pathway respectively pass through the fulcrum of the turntable.

6 Claims, 5 Drawing Sheets

SWITCH FOR A POWERED PALLET CONVEYOR

RELATED APPLICATION

This application claims priority to German Patent Application Number DE 20 2008 016 678.0, filed on Dec. 17, 2008, the contents of which are incorporated by reference herein in its entirety.

The present invention relates to a switch for a powered pallet conveyor. Moreover, the present invention relates to a rail system for a powered pallet conveyor, which comprises a switch according to the invention, as well as a conveying system which comprises the rail system and at least one vehicle of a powered pallet conveyor. Lastly, the present invention relates to a special pallet store, which comprises a switch according to the present invention. A switch according to the present invention has the advantage that conveyance can be considerably accelerated, because the positioning of the switch is independent from the position of the conveying vehicle in the rail system.

BACKGROUND TO THE INVENTION

Powered pallet conveyors are known and are conventionally utilized for the transport of pallets and containers between a high bay warehouse and consignment bases or for loading and unloading of trucks and trailers with pallets or containers. Powered pallet conveyors comprise a vehicle and a rail system which defines the pathways on which the vehicle should travel.

Conventional rail systems for a powered pallet conveyor may comprise switches for allowing the vehicle to travel on alternative pathways. U.S. Pat. No. 4,498,399 discloses a special switch arrangement for a conveying appliance. In the prior art two further types of switches are known, namely a quadro-switch and a rotation switch.

Figure 4:
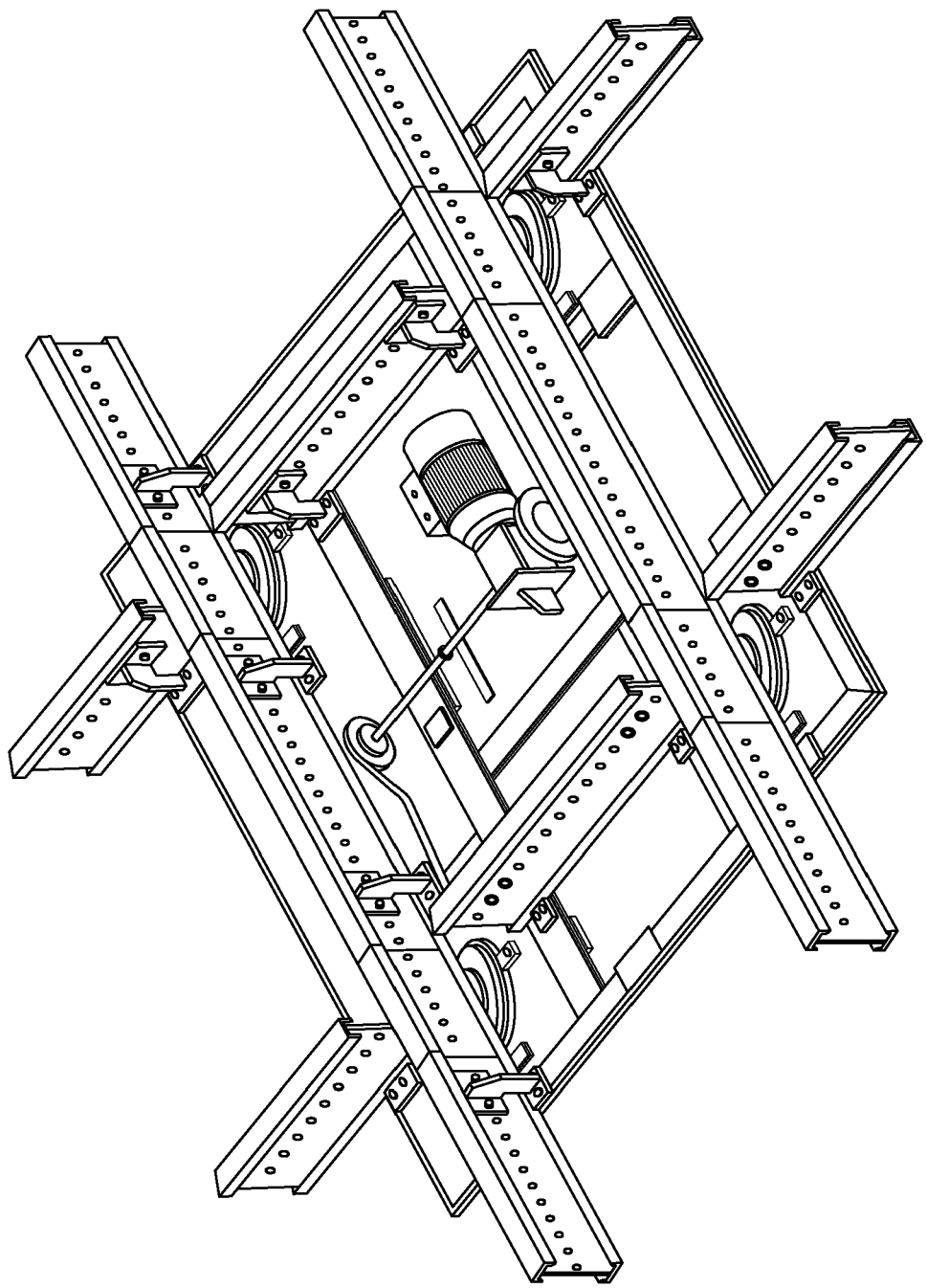

A quadro-switch, as shown in FIG. 4, is positioned by initially bringing the pivotable wheels of the vehicle to a stop on rail portions rotatable in a plane level with the ground, wherein the pivotable wheels are pivotable about an axis perpendicular to ground level. Subsequently the rotatable rail portions are rotated so that the wheels of the vehicle are oriented along and guided to the new travel pathway. This process requires that the vehicle stops on the switch during the positioning process, such that the positioning of the switch delays the transport process.

Figure 5:
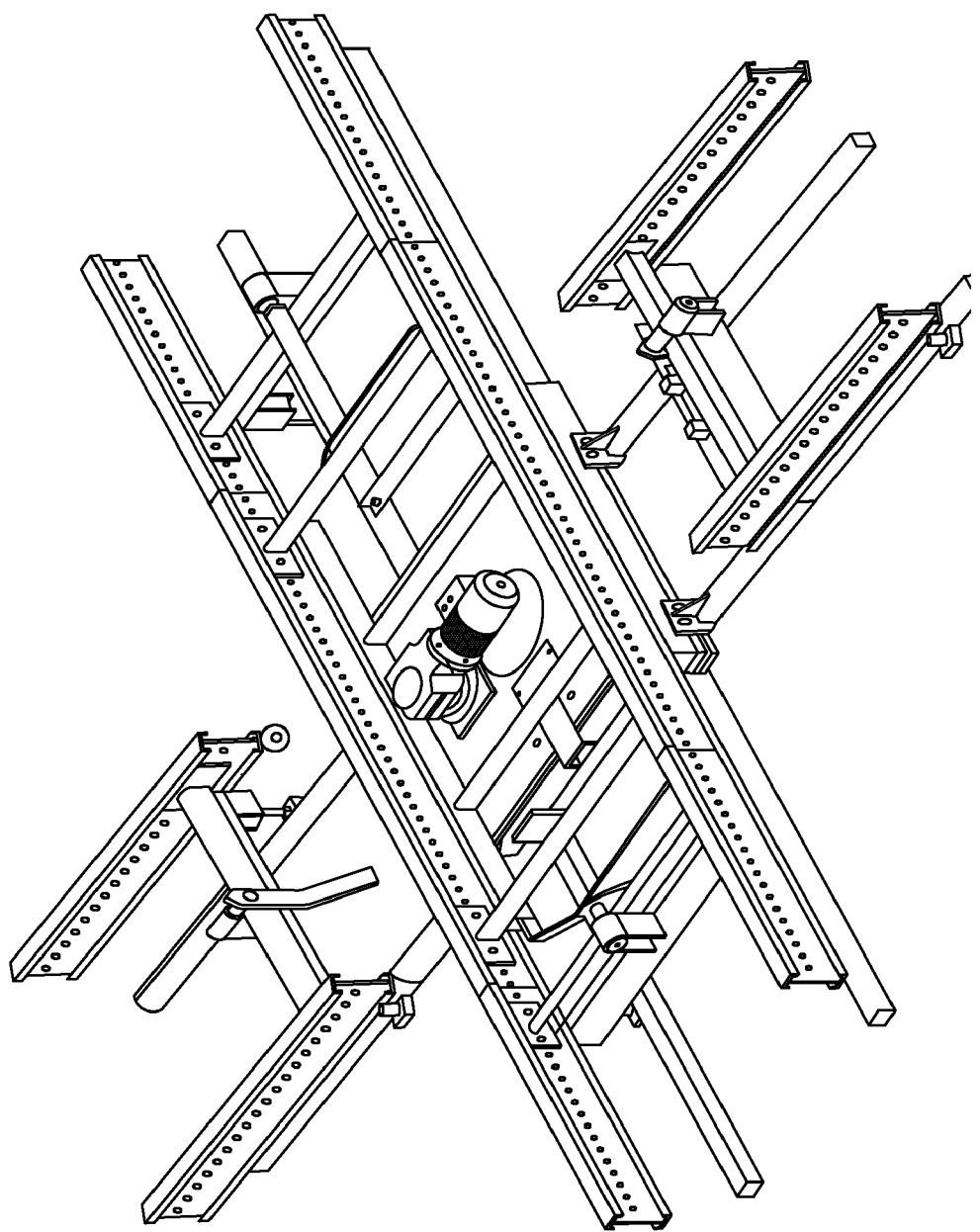

A rotation switch, as shown in FIG. 5, is likewise operated by first positioning the vehicle on the switch, so that the vehicle can be rotated as a whole on a rotatable turntable.

Subsequently the rotatable turntable is rotated, so that the vehicle is oriented along and guided to the new travel pathway.

Both switches are unsatisfactory in so far as the vehicle cannot travel continuously across the switching means without stopping in between. As a consequence the employment of a conventional switch results in a limitation of the maximum speed which the powered pallet conveyor can fulfill a conveying task. The limitations imposed by the switch increase in proportion to the number of switches employed in the pathway.

Furthermore, conventional switching means have considerable space requirements. Moreover, vehicles which are subjected to frequent acceleration/deceleration suffer from increased wear, so that high maintenance costs occur.

SUMMARY OF THE INVENTION

It is the problem of the present invention to provide a switch for a rail system for a powered pallet conveyor which has no effect on the conveying speed, because the vehicle can travel continuously across the switch without stopping in between, whereby the switching means has reduced space requirements and can be positioned independently from the position and the speed of the vehicle, so that wear is reduced and high maintenance costs are avoided.

This problem is solved according to the present invention by a switch for a powered pallet conveyor, comprising:
 (a) a turntable,
 (b) rail portions which are arranged on the turntable and define a minimum of two travel pathways,
 whereby a first travel pathway is defined by straight rail portions and a second travel pathway is defined by curved rail portions, so that the central line of the first travel pathway and the departure lines of the second travel pathway respectively pass through the fulcrum of the turntable.

The invention also provides a rail system for a powered pallet conveyor, that comprises a minimum of two travel pathways as well as a switch according to the present invention.

Furthermore, the present invention provides a conveying system that comprises a rail system according to the invention as well as at least one vehicle of a powered pallet conveyor.

Lastly, the present invention provides a pallet store, which comprises a device for storage of pallets, a device for delivery of pallets, as well as a conveying system according to the invention which is suitable to convey pallets from the device for storage to the device for delivery.

Preferred embodiments of the invention are the subject matter of the dependent claims.

Figure 1:
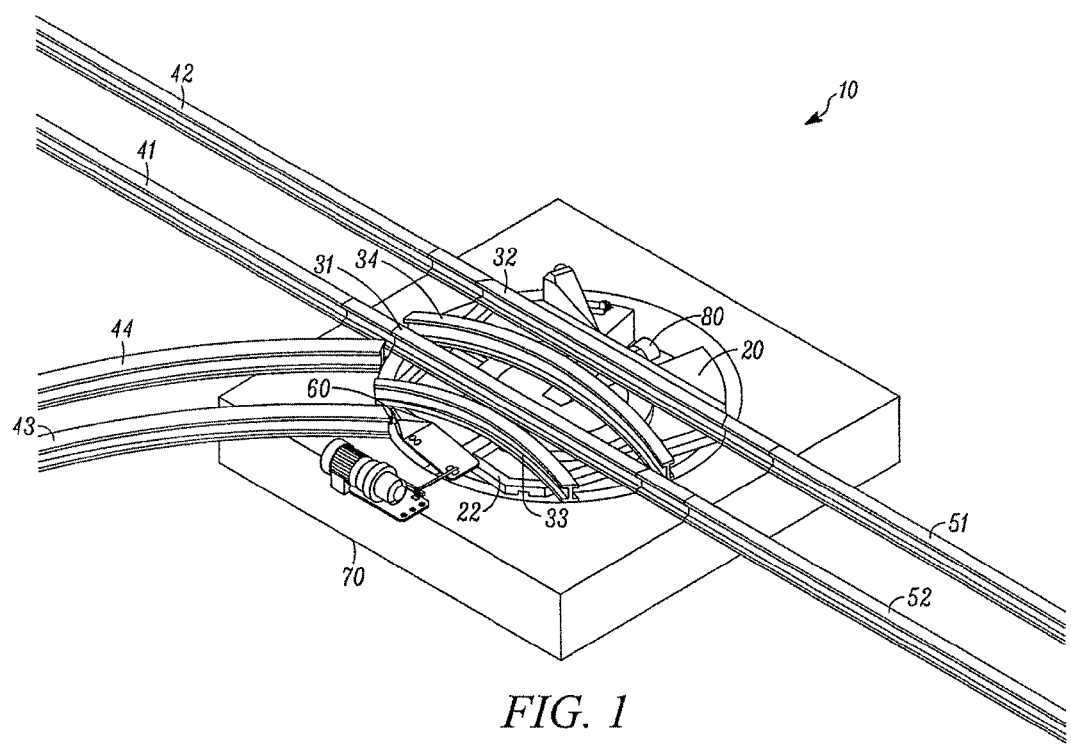
Figure 2:
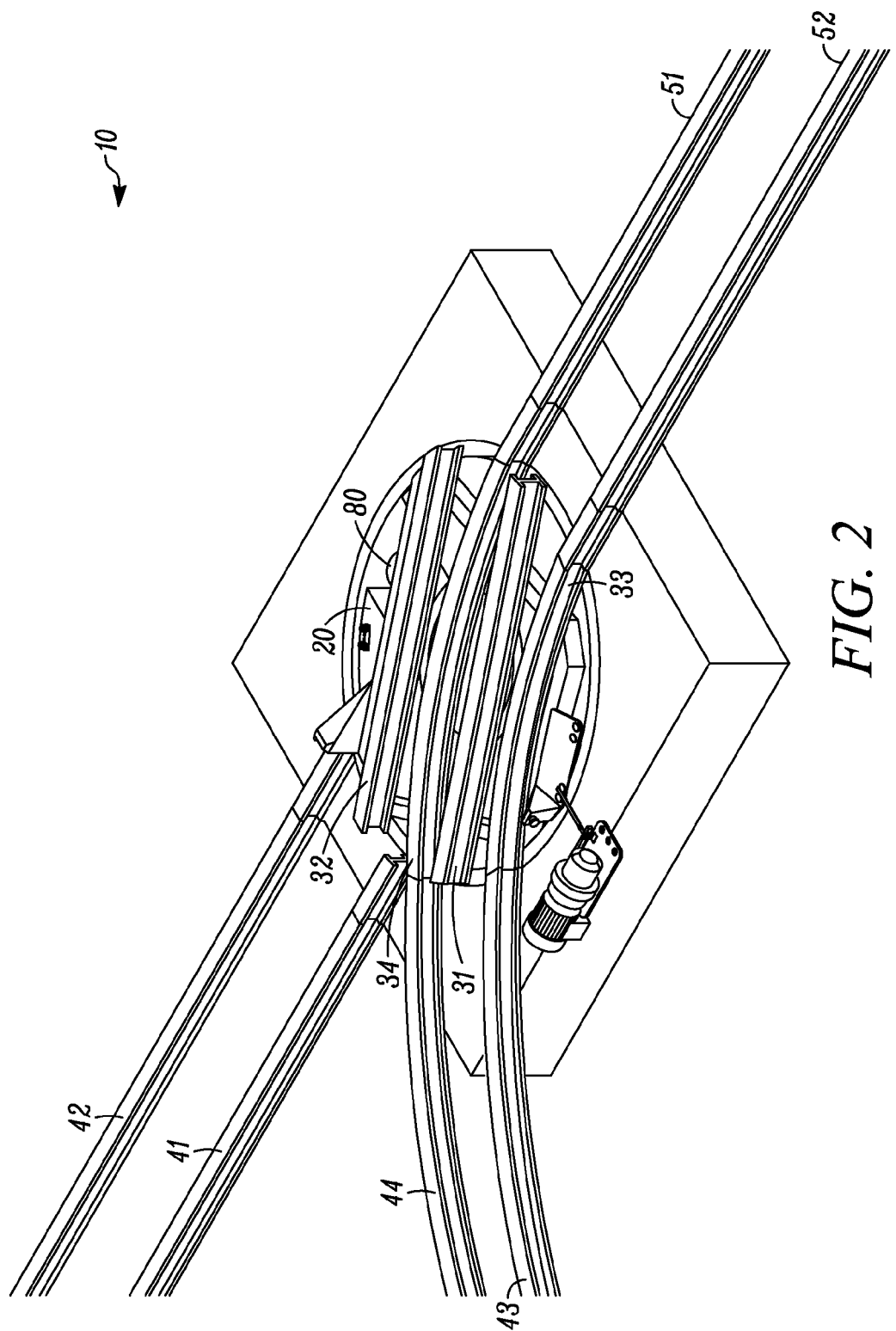
Figure 3:
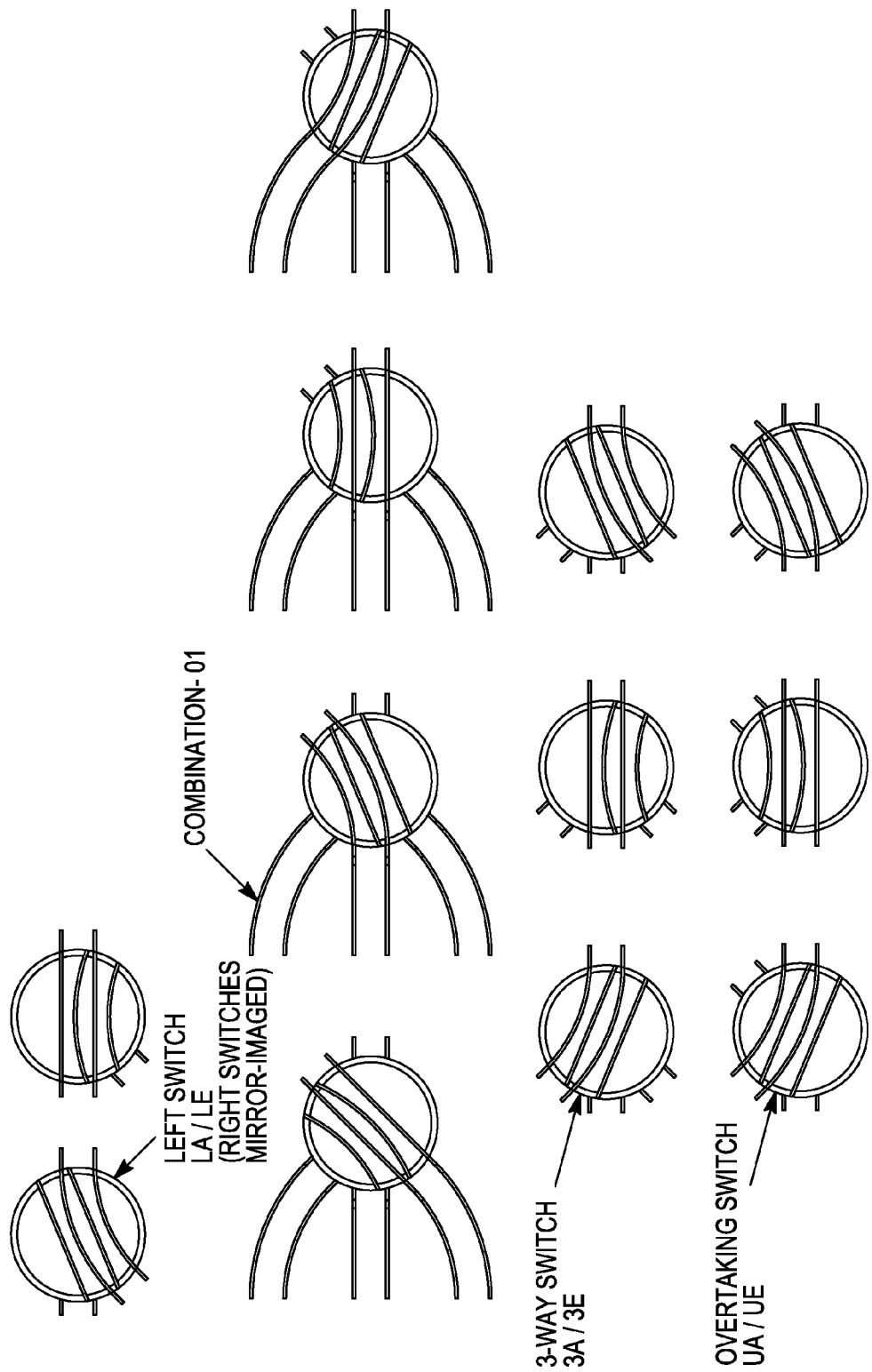

The subject matter of the invention is illustrated by the following diagrams. These show:
 FIG. 1 a preferred embodiment of a switch of the invention;
 FIG. 2 a preferred embodiment of a switch of the invention;
 FIG. 3 shows in partial view, different states of a switch in a rail system of the invention.
 FIG. 4 a known quadro switch of the prior art;
 FIG. 5 shows a known rotation switch of the prior art.

DETAILED DESCRIPTION OF THE PREFERRED EMBODIMENTS

According to the invention the switch for a powered pallet conveyor comprises a turntable as well as rail portions, which are arranged on the turntable and define a minimum of two travel pathways. Preferably, a travel pathway comprises two parallel rails upon which a vehicle is guided. Such a rail guide is a linear system by which one or more guided wagons run upon a pair of rails and lead to a translation of movement. The track gauge of the travel pathway preferably lies in the range of from 400 to 1500 mm, in particular in the range of from 500 to 1000 mm and more preferably at most 800 mm.

The turntable is arranged in a rail system in such a way, that rotation of the turntable can bring at least one travel pathway arranged on the turntable into a position in which the rail portions provided on the turntable allow a translation of movement of a guided wagon from a stationary rail inlet across the switch to a stationary rail outlet, wherein the translation of movement is independent from the position of the guided wagon during the rotation of the turntable. This means that the switch according to the invention can be positioned without arranging the guided wagon upon the switch.

The rail guide is preferably a roller rail guide conventional with powered pallet conveyors, which, similarly to roller bodies separated by roller bearings or linear ball bearings, reduces the friction between the different elements and respective components of the guide and, therewith, considerably facilitates the movement of the parts to be guided.

The rail pathway defining a travel pathway comprises parallel rails. Parallel rails are rails, which are equally distanced from each other (wherein the minimum distance between the rails is essentially the same at every position along the length of the rails). The rail system of the present invention comprises a minimum of two alternative travel pathways, of which each comprises a minimum of two parallel switchable rails.

Each rail can be divided into many rail portions. At least one rail of the travel pathway preferably comprises an electrical conductor, which provides the vehicle with drive power and, as the case may be, steering signals, and, as the case may be, is used for relaying sensor information. An electrical conductor can be a cable and preferably comprises an electrically conductive solid wire or woven strands. The electrically conductive wire or the woven strands comprise a metal, that may be chosen from the list which comprises copper, aluminium, gold and silver, either singly or in combination. The wire may be jacketed in an electrically insulative material such as, for example, polyethylene or polyvinylchloride. In order to protect the cable a further jacketing with mineral insulation, fiberglass armour, helical steel tape, aluminium armour, lead armour, woven bronze wire or woven steel wire may be employed. Alternatively, multiple wires, each optionally insulated, can be provided in the electrically insulative jacket.

A first travel pathway is defined by straight rail portions on the turntable of the switch. Preferably, the straight rail portions run parallel and symmetric to a longitudinal axis of the turntable passing through the fulcrum of the turntable.

A second travel pathway is defined on the turntable of the switch by curved rail portions.

The central line of the first travel pathway and the departure lines of the second travel pathway respectively run through the fulcrum of the turntable. The departure lines of the second travel pathway preferably form an angle in the range of at most 60° with the central line of the first travel pathway. More preferably, the departure lines of the second travel pathway form an angle in the range of at most 55°, in particular at most 50°, with the central line of the first travel pathway.

Advantageously, a curved rail portion is arranged between two straight rail portions upon the turntable. In this way, the switch can be dimensioned small with a large angle between the departure lines of the second travel pathway and the central line of the first travel pathway.

The turntable upon which the rail portions are provided, is not particularly limited with respect to its construction, provided that it is able to bring the rail portions into a desired position and to lend stability to the travel pathway, thus opened. In a preferred embodiment, the turntable is provided as a turntable rotatable upon a substructure. The substructure can be a frame which is provided below ground level. An axle is preferably provided in the substructure, which passes through the fulcrum of the turntable. Furthermore, the substructure preferably comprises a drive with which it is possible to rotate the turntable. An electric drive for rotation of the turntable is preferred. In one embodiment, the axle passing through the fulcrum of the turntable is driven. In an alternative embodiment the turntable is driven by a drive in the border area. As a drive for the turntable, an electric motor and, if need be, a suitable gearing, is preferably employed.

The turntable of the switch according to the invention is subjected to a higher load during normal operation, in particular when a vehicle is moved from a rail inlet to the turntable or from the turntable to a departure rail, respectively. Since an exact arrangement of the rail portions is of great importance in this area, measures are preferably taken to ensure an exact positioning of the rail portions. To this end, the substructure preferably comprises a running surface, which supports the turntable in a boundary area. In particular, supporting rollers can be provided, which lie upon the running surface of the substructure. The supporting rollers can be provided on the turntable. Furthermore, the turntable can be locked in a predetermined position, so that further rotation is hindered and an exact positioning is afforded.

For a central steering of the switch, it is frequently sensible to determine the position of the turntable. To this end, sensors for determining the position of the turntable are preferably provided on the switch.

The present invention further relates to a rail system for a powered pallet conveyor, which comprises at least two travel pathways, which can be served from the switch according to the invention. The rails of the rail system comprise fixed (non-movable) portions of a rail, as well as the rail portions of the first and second travel pathways provided on the turntable which can be selectively positioned in order to bridge the fixed portions of the rail. Further, the rails can comprise a means for conducting electricity such as, for example, an electrically conductive "third rail" system for electrification of the rail system. A rail system according to the invention is preferably employed with at least one vehicle of a powered pallet conveyor in a conveying system.

Material which is suitable for the construction of the rails comprises metals, alloys and polymers, which can be employed singly or in combination. The rails can comprise a metal, selected from iron, copper, aluminium, tin, zinc, titanium, lead, manganese, chromium, vanadium and tungsten, either singly or in combination. In a further embodiment, the rails can comprise an alloy selected from steel, brass, bronze, Hastelloy, Electrum, Cupronickel and Duralumin. Optionally, the rails can comprise a polymer such as, for example, polyethylene, polystyrene, nylon and teflon, either singly or in combination. Particular combinations of these metals as composites, laminates, impregnates or coated material may be used to provide rails with specific properties. For example, the rails may comprise a hybrid material such as, for example, steel laminated with aluminium which is not only capable of withstanding the stresses involved in conveying and guiding a vehicle along alternative pathways, but is also highly conductive. Alternatively, the rails may comprise iron or steel, that is coated or laminated with teflon so as to reduce friction and wear. Alternatively, the rails may comprise an electrically conductive material such as, for example, brass, or a metal coated polymer, so as to themselves form an electric cable means along the travel pathway.

Each rail may have a profile which is a particular shape in cross section. In a preferred embodiment, the cross section may be an I-(or H-) shape, a T-shape, an L-shape, a U-shape or a rectangular shape. Variations on these profiles such as, for example, the asymmetrical I-beam, flatbottomed, bullhead, single parallel, parallel, grooved rail, flanged rail or bridge rail profiles may be employed, either singly or in combination. Most preferred is the embodiment in which the rail is an I-shape in cross section.

A conveying system according to the invention is preferably part of a pallet store, that further comprises a device for storage of pallets and a device for delivery of pallets and is suitable to convey pallets from the device for storage to the device for delivery. The total weight of a pallet lies preferably in the range of from 300 to 1500 kg. The radius of the curve of the railway in the rail system preferably lies in the range of from 150 cm to 800 cm.

The present invention is now illustrated by means of preferred embodiments.

FIG. 1 shows a switch 10 according to the invention, with a turntable 20. Rail portions 31, 32, 33 and 34 are arranged on the turntable 20. The rail portions 31 and 32 are straight and define a first travel pathway. The rail portions 33 and 34 are curved and define a second travel pathway. The first travel pathway comprises, in addition to the straight rail portions 31, 32, the adjacent rail pieces 41, 42 and 51, 52. The second travel pathway comprises, in addition to the curved rail portions 33 and 34, the adjacent rail portions 43, 44 and 51, 52. In this way a vehicle can be moved from the rail portions 51, 52 in the direction of the switch and can be guided across the switch either to the rail portions 41, 42 or to the rail portions 43, 44, depending on the positioning of the turntable 20 and, thus, the straight rail portions 31, 32 or the curved rail portions 33, 34, respectively. On the other hand, a vehicle can be moved from the rail portions 41 and 42, respectively, in the direction of the switch and then be led over the rail pieces 31, 32 of the switch to the rail portions 51, 52 and, finally, after positioning of the switch, over the rail portions 31, 34 to the rail portions 43, 44. The position of the switch shown in FIG. 1 allows a crossing of the switch from the rail pieces 41, 42 to the rail portions 51, 52. In this position a vehicle is prevented from entering the switch from the rail portions 43, 44 by a block 60 which is arranged on the turntable. The positioning of the switch is effected by an electric motor 80, which drives the turntable 20 over a gearing. The switch further comprises a locking device 70. The locking device comprises a bolt, which is driven by a further electric motor. Before the switch is positioned, the locking device 70 moves the bolt back from the locking position and releases the turntable 20. In this position the turntable 20 can be rotated. When the turntable 20 has reached its desired position, the locking device 70 shifts the bolt into a locking position, so that the inertia or the weight of the vehicle can no longer influence the position of the turntable. The turntable 20 comprises a frame 22 for stabilization of the rail portions 31, 32, 33, 34, which thereby ensures that the turntable is not deformed due to the high forces while the switch is crossed with a vehicle. The turntable is mounted in a lower frame (not shown). In the embodiment shown in FIG. 1, the departure lines of the second travel pathway form an angle of approximately 45° with the central lines of the first travel pathway. This geometry is possible, even with a turntable of smaller dimension, because a curved rail portion is arranged between two straight rail portions upon the turntable.

FIG. 2 shows the switch represented in FIG. 1 in a position which allows routing of a vehicle over the switch between the rail portions 43, 44 and 51, 52. To this end, the turntable is rotated into a position in which the curved rail portions 33, 34 butt against the rail portions 43, 44 and 52, 51, respectively. Conversely, a vehicle is allowed to travel in the opposite direction with the switch shown in the figure, if the vehicle is advanced to the switch from the rail portions 51, 52 and is led either, as shown, over the rail portions 33, 34 to the rail portions 43, 44, or, if the switch is arranged in the position shown in FIG. 1, over the rail portions 31, 32 to the rail portions 41, 42.

FIG. 3 shows the switch shown in FIGS. 1 and 2 in different variations of how a rail system can be formed.

The invention claimed is:

1. A switch for a powered pallet conveyor, the switch comprising:
   (a) a turntable;
   (b) rail portions which are arranged on the turntable and define at least a first travel pathway and a second travel pathway having departure lines;
   whereby the first travel pathway is defined by straight rail portions and the second travel pathway is defined by curved rail portions, so that the central line of the first travel pathway and the departure lines of the second travel pathway respectively pass through the fulcrum of the turntable; said first and second travel pathways each comprising two rail portions, the departure lines of the second travel pathway form an angle of at most 60° with the central line of the first travel pathway, a curved rail portion arranged between two straight rail portions upon the turntable, and the two straight rail portions running parallel and symmetric to a longitudinal axis of the turntable passing through the fulcrum of the turntable.

2. The switch of claim 1, wherein the track gauge of the travel pathways lies in the range of from 500 to 1500 mm.

3. The switch of claim 1, wherein the turntable is rotatably provided on a substructure.

4. The switch of claim 3, wherein the substructure further comprises a running surface which supports the turntable in the border area.

5. The switch of claim 1, wherein the turntable can be locked in a predetermined position, so that further rotation is prevented.

6. The switch of claim 1, further comprising an electrical drive for rotation of the turntable.

* * * * *